US012068606B2

(12) United States Patent
Weidman et al.

(10) Patent No.: US 12,068,606 B2
(45) Date of Patent: Aug. 20, 2024

(54) METHOD AND APPARATUS FOR ELECTRICAL LOAD CONTROL NETWORK

(71) Applicant: The Watt Stopper, Inc., Carlsbad, CA (US)

(72) Inventors: Louia Weidman, Carlsbad, CA (US); Peter John Horton, Carlsbad, CA (US); Jason H. Joyce, Carlsbad, CA (US); Eric J. Fournier, Carlsbad, CA (US)

(73) Assignee: The Watt Stopper, Inc., Carlsbad, CA (US)

( * ) Notice: Subject to any disclaimer, the term of this patent is extended or adjusted under 35 U.S.C. 154(b) by 0 days.

(21) Appl. No.: 18/347,204

(22) Filed: Jul. 5, 2023

(65) Prior Publication Data
US 2024/0047967 A1    Feb. 8, 2024

Related U.S. Application Data

(63) Continuation of application No. 17/547,749, filed on Dec. 10, 2021, now Pat. No. 11,735,918, which is a continuation of application No. 17/175,290, filed on Feb. 12, 2021, now Pat. No. 11,201,499, which is a continuation of application No. 16/678,930, filed on Nov. 8, 2019, now Pat. No. 10,923,948, which is a continuation of application No. 16/209,120, filed on Dec. 4, 2018, now Pat. No. 10,476,301, which is a continuation of application No. 15/445,661, filed on Feb. 28, 2017, now Pat. No. 10,148,125, which is a continuation of application No. 13/943,643, filed on Jul. 16, 2013, now Pat. No. 9,583,944, which is a continuation of application No. 12/773,842, filed on May 20, 2010, now Pat. No. 8,487,474.

(51) Int. Cl.
*H02J 3/14*         (2006.01)
*H02J 13/00*        (2006.01)

(52) U.S. Cl.
CPC .......... *H02J 3/14* (2013.01); *H02J 13/00004* (2020.01); *H02J 13/00007* (2020.01); *H02J 13/00016* (2020.01); *Y02B 70/3225* (2013.01); *Y02B 90/20* (2013.01); *Y04S 20/222* (2013.01); *Y04S 40/124* (2013.01)

(58) Field of Classification Search
CPC ... H02J 3/14; H02J 13/00007; Y02B 70/3225; Y04S 20/222; Y04S 40/124
See application file for complete search history.

(56) References Cited

U.S. PATENT DOCUMENTS

2004/0212481 A1* 10/2004 Abraham ............... H04B 3/542
                                                                370/487

* cited by examiner

*Primary Examiner* — Daniel Cavallari
(74) *Attorney, Agent, or Firm* — Crockett & Crockett, PC; K. David Crockett, Esq.; Niky Economy Syrengelas, Esq.

(57) ABSTRACT

The methods and apparatus described enable automatic configuration, or commissioning, of controller devices and load control devices through a low voltage communication network controlled by one or more controller devices. These methods and apparatus further enable expansion of the load control system by connection of additional loads and or load control devices and or controller devices which will reinitialize the low voltage communication network and automatically reconfigure the controller devices and load control devices connected to the network.

4 Claims, 3 Drawing Sheets

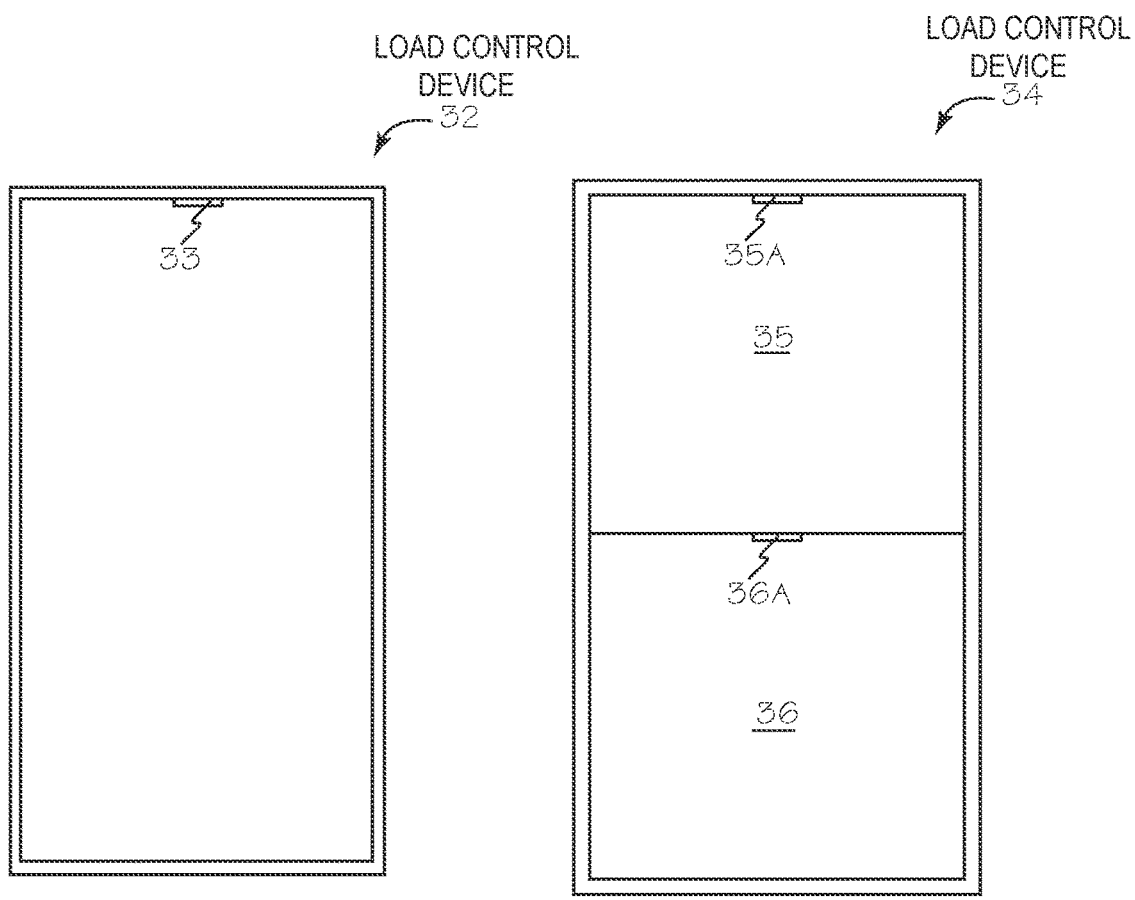

METHOD AND APPARATUS FOR ELECTRICAL LOAD CONTROL NETWORK

RELATED APPLICATIONS

This application is a continuation of U.S. application Ser. No. 17/547,749, filed Dec. 10, 2021, which is a continuation of U.S. application Ser. No. 17/175,290 filed Feb. 12, 2021, now U.S. Pat. No. 11,201,499, which is a continuation of U.S. application Ser. No. 16/678,930, filed Nov. 8, 2019, now U.S. Pat. No. 10,923,948, which is a continuation of U.S. application Ser. No. 16/209,120, filed Dec. 4, 2018, now U.S. Pat. No. 10,476,301, which is a continuation of U.S. application Ser. No. 15/445,661, filed Feb. 28, 2017, now U.S. Pat. No. 10,148,125, which is a continuation of U.S. application Ser. No. 13/943,643, filed Jul. 16, 2013, now U.S. Pat. No. 9,583,944, which is a continuation of U.S. application Ser. No. 12/773,842, filed May 20, 2010, now U.S. Pat. No. 8,487,474.

FIELD OF THE INVENTIONS

The inventions described below relate to the field of electrical load control systems and more specifically to open topology electrical load control networks.

BACKGROUND OF THE INVENTIONS

Electrical load control systems have developed from simple knife switch controls to relay control networks with sensors and switches and network control management systems. Simple and complex networked load control systems require strict attention to the network topology required for the hardware being used. Additionally, once properly wired, loads and controls require special tools to link a specific sensor and or control to a specific load.

SUMMARY

The methods and apparatus disclosed are directed to an electrical load control system that includes a controller device that is electrically coupled to load control devices. The system is preferably configured to control or operate any electrical load in response to control signals generated by the load control devices. Load control devices are manually and automatically activated switches as well as motion sensors, light sensors, heat sensors or a combination thereof. The load control devices are electrically coupled to the controller device via cables and cable connectors to form a communication and low voltage network. The cables and cable connectors are, for examples CAT-5 cables with RJ-45 connectors.

Load control devices generate control signals to control the application of electrical line power to electrical loads. Additionally, each load control device has what is referred to herein as an automatic initial commissioning or configuration feature. Automatic initial commissioning allows a new control device to be connected or integrated into the system network and automatically operate according to the automatic configuration and communication protocol in the controller devices. The automatic configuration protocol initiates when the controller device is powered-on by the network, whereby the controller device or devices on the network automatically run a self-configuration or self-commissioning program and notify the controller device and/or other controller devices within the system what kind of control device it is as well as its rank, seniority or priority. Alternatively, selective commissioning may be accomplished through load control devices transmitting configuration commands to one or more controller devices to override the automatic configuration and establish an alternative commissioning or configuration.

A controller device has the capability to initiate a commissioning or configuration mode for all the devices connected to the entire low voltage communication network. Automatic configuration or commissioning can be initiated from any component connected to a low voltage communication network that is acting as a controller device and does not require a separate commissioning tool or a specific commissioning control device on the network.

The electrical load control system does allow for use of a commissioning tool for the convenience of an installer and user for complex layouts or re-commissioning once the load control system is installed. However, use of separate configuration tools is completely optional. All configuration can be done using just the components in the system.

The electrical load control system uses a network model that is independent of any external network connection, topology or protocol. Capability may be built into all controllers or just specific models of controllers for expanding control to multiple rooms and multiple types of loads. In this context, a "room" may literally be a single space bounded by walls, floor and ceiling, such as a conference room, or it may be a series of rooms, such as a pod of classrooms, or it may be a large convention hall that may be partitioned. As such, the "room" is really the extent of the network and not a specific physical space.

The disclosed electrical load control system is based on a free topology wiring scheme that allows any suitable network topologies. e.g., loop, star, wheel, etc. This frees both the wiring designer and the wiring installer from burdensome and time consuming processes that are required using other topologies that require very specific wiring layouts. Less time and less resources are used in design and installation. Thus, energy savings are actually realized sooner in the home or facility design and in the construction process than with conventional systems that require careful wiring layouts in design and installation.

The methods and apparatus described enable automatic configuration, or commissioning, of controller devices and load control devices through a low voltage communication network controlled by one or more controller devices. These methods and apparatus further enable expansion of the load control system by connection of additional loads and or load control devices and or controller devices which will reinitialize the low voltage communication network and automatically reconfigure the controller devices and load control devices connected to the network.

The devices and methods described below provide a system for controlling the application of electrical power to electrical loads. In addition to a power network interconnecting the electrical loads to line power, the system includes a low voltage communication network interconnecting at least one controller device and one or more load control devices. Each controller device provides electrical power to the low voltage communication network and each load control device receives electrical power from the low voltage communication network as well as transmitting one or more identification signals and one or more control signals through the low voltage communication network. The one or more control signals indirectly control the application of electrical power to the electrical loads. Each controller device includes a configuration means and processing means. The processing means for receiving and processing identification signals from each of the load control devices, the other controller devices and the loads. The processing means using the configuration means to generate and transmit configuration signals to the load control devices and the other controller devices. The processing means further receiving and processing control signals from the power control elements and directly controlling the application of electrical power to electrical loads according to the control signals and the configuration signals.

BRIEF DESCRIPTION OF THE DRAWINGS

FIG. 3 is a front view of a load control device.
FIG. 4 is a front view of an alternate load control device.

DETAILED DESCRIPTION OF THE INVENTIONS

Figure 1:
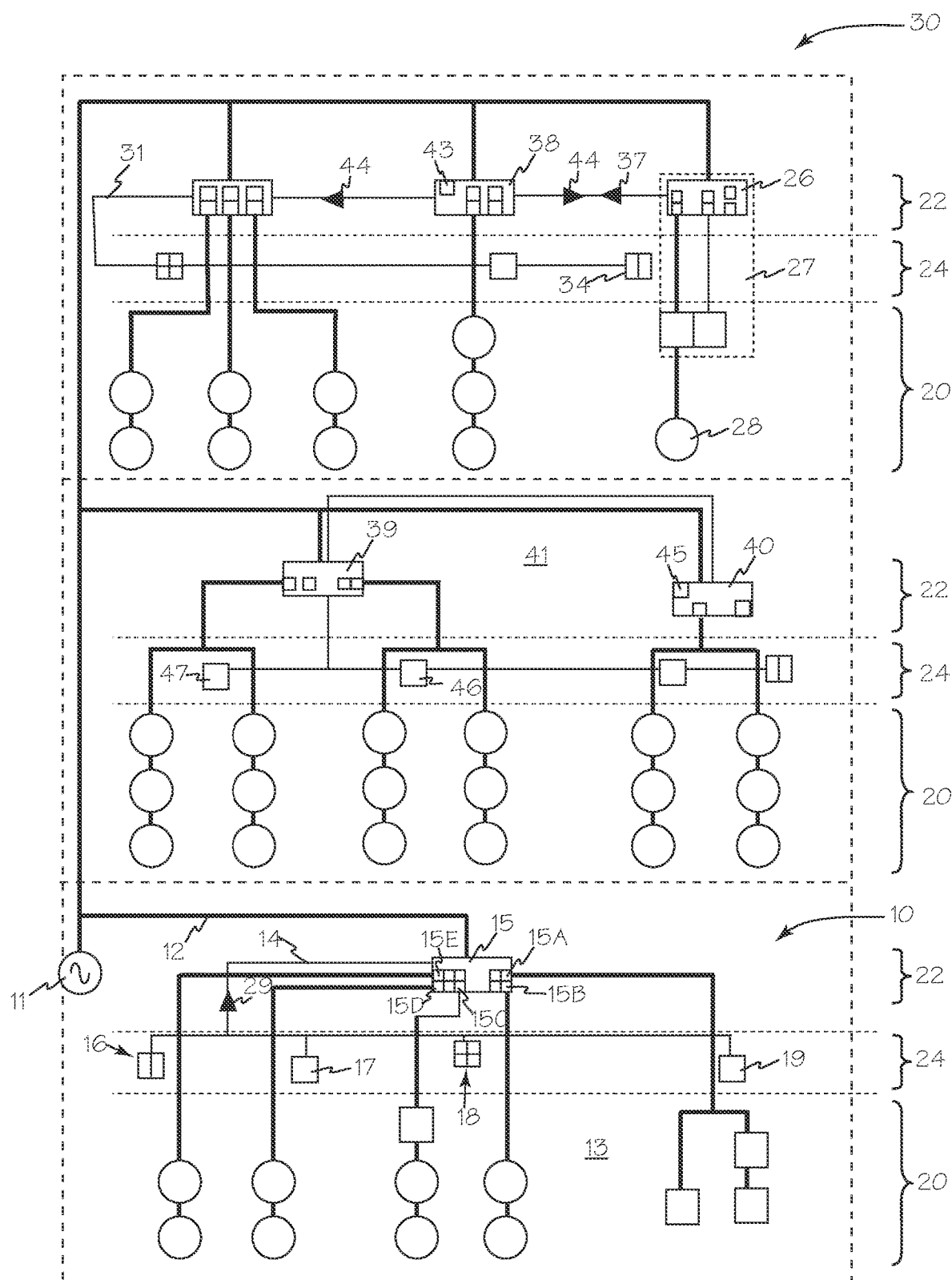
FIG. 1 is a block diagram of an electrical load control system.

Electrical load control system 10 of FIG. 1 controls the application of line or house power 11 from line power network 12 to loads 20 in space 13. Low voltage power and communication network 14 interconnects one or more controller devices such as controller device 15 to one or more load control devices such as switch 16, sensor switch 17, multi-switch 18 and sensor 19. Loads 20 may be any electrical load such as lights, heaters, HVAC, blinds, motors or other load.

Controller devices such as controller 15 in controller level 22, supply low voltage power to each load control device in load control level 24 using low voltage power and communication network 14. Controller 15 receives any suitable power such as line or house power 11 for internal use as well as for supplying to the loads 20. Controller devices such as controller 15, directly control power delivered to a load such as loads 20. Controller devices may also be provided as plug load controllers such as controller device 26 which are built into electrical sockets such as socket assembly 27 to control power to loads plugged into the socket such as load 28. Plug load controllers generally do not provide low voltage power to load control devices but may be configured to do so.

Load control devices in load control level 24 provide control signals such as load control request 29 through low voltage power and communication network 14 and also display the status of the load or loads that the load control device controls such as switch, switch array, sensor including multiple sensors in a single device or remote controls.

Low voltage power and communication network 14 provides communication path and power path between controller devices in level 22 and load control devices in level 24 using suitable cabling and connectors, and including a suitable communication protocol.

Electrical loads in load level 20 are the line power consuming devices being controlled by the system e.g., lighting, HVAC, shades, etc., wherein the control is typically controlled application of energy, line power to the load such as on/off, dimming, motor speed, etc.

Electrical load control system 30 includes a free topology low voltage communication network 31, and load control devices in load control level 24 such as switches, sensors and the like may be connected in any combination between themselves and/or the controller device or devices in controller level 22 which only needs to be somewhere in the network. There is a practical limit on the number of load control devices, as well as controller devices in multi-controller configurations, due to designed-in capacity limitations in the low voltage power and communication network 14 as noted above. Furthermore, the "free topology" does not require terminators thereby reducing installation errors. Such a system can be based on a current loop scheme, but any suitable network configuration that does not require termination could be used.

Referring now to FIGS. 3 and 4, each load control device such as load control device 32 has an indicator, preferably an LED indicator or an LCD display, such as indicator 33 that shows the status of the load to which it is configured or bound and that it controls. In a first configuration, an indicator on each load control devices is ON when electrical line power is applied to the load and is OFF when no electrical line power is applied to the load.

In an alternate configuration, load control device 34 includes two or more load control assemblies such as first load control button 35 and second load control button 36. The load control device must receive a confirming message such as confirmation signal 37 from controller device 26 that load 28 is truly ON before the load control device 34 can display the ON status by illuminating indicator 35A. This improvement allows an error condition to be sent to a load control device and displayed accordingly. LED blinking patterns or multiple LEDs may be used to indicate the status of loads that may have multiple levels of operation, such as a dimming level or a bi-level setting.

Controller devices preferably have separate switches or power control elements such as power control elements 15A, 15B, 15D and 15E such as for applying electrical line power to the load or loads connected to them. This is useful for testing purposes during installation. Controller devices and load control devices also preferably have status indicators such as component health or operational status, which can be separate or can be a single indicator that performs multiple functions. For example, a single LED may be used to indicate power "on" and load health status.

Status indicators may also be different from load health indicators, e.g., by using different color LEDs, so that the status or "health" of the component can be easily differentiated from the load power status. In another configuration, the prominence of a health indicators is minimized to minimize distractions to users except in the case of activation of a health monitor. Since the low voltage power and communication network 14 is purposefully limited in the number of components that can functionally interconnect through it, it is also important for overload monitoring on the network in the case that too many components are connected. Overload monitoring preferably includes a technique to disable network power as needed and indicate this fault condition.

The electrical load control system includes the capability for automatic as well as manual commissioning or configuring of load control devices and corresponding loads in each and every component of the system without the need for special commissioning tools or complex protocols.

In order to identify each component of the system, a standard Media Access Control (MAC) address is assigned at the time of manufacture to each component. The preferred technique is to have the identity preassigned, however, any unique identification scheme may be used. Since the MAC address of every single device is unique, the value of the MAC address is used to assign Master/Slave, priority status, rank or hierachy for devices interconnected through the system. For example, controller devices may be configured in a master/slave relationship so that only one controller device on the network establishes the automatic commissioning assignments.

In a preferred configuration, the controller device having the highest value MAC address is the master in a multi-controller configuration such as controller device 38 in electrical load control system 30. In addition, MAC address blocks are reserved for families of products to create an inherent hierarchy. For example, a controller device designed to drive 2 loads such as controller device 39 will automatically be assigned a MAC address that will be higher than any controller designed to drive only one load such as controller device 40, thereby ensuring that the 2-load controller will be the master in a configuration employing both a 2-load and a 1-load controller as in space 41. This dual use of the MAC address for prioritization is unique and provides two advantages in a self-commissioning network: a) it provides a way for all devices on a network to establish a hierarchy for the purposes of control and communication within the network; and 2) it provides a way to ensure that certain devices are always assigned a higher ranking or priority than other family devices to advantageously utilize characteristics in certain devices that are not present in other devices.

Upon the initial application of system, house or line power 11, each device interconnected in a network, such as devices in levels 22 and 24, broadcasts its MAC address to all other devices connected to the network. The controller devices in level 22 arbitrate to work out which one is the master if multiple controller devices are installed such as in networks 31 and or 42, otherwise the single controller device is the master by default. The master controller then uses the established MAC address precedence to assign identifiers to each controlled load in the system. Controller device identifiers such as identifier 43 are assigned in ascending order starting with the master controller (highest MAC address). For example, a two-load master controller would be assigned load identifiers LD1 and LD2, while a slave two-load master controller would be assigned load identifiers LD3 and LD4. The same two advantages noted above for device prioritization hold true for using the MAC address for load identification, i.e., a hierarchy of loads is easily established and certain loads will always be higher in the prioritization than other loads, which may facilitate installation. For example, it will be easy to wire emergency lighting to a master controller device by simply inspecting the MAC address printed on the controller's label thereby ensuring that emergency lighting always gets the highest enumerated load identification that may facilitate standardization in a large commercial installation. In addition, the master controller device preferably assumes full responsibility for supplying power to the load control devices so that multiple controllers are not all trying to supply power. However, other controller devices may be asked to supply additional power (in parallel) depending on the number of controller devices attached to the network and the power handling capability of the network media.

In likewise manner, the load control devices in level 24 are enumerated. For example, multiple two-button switch devices on the network have their buttons numbered according to the MAC address hierarchy such that the highest MAC address switch is assigned switch identifiers BT1 and BT2, the next highest MAC address switch is assigned identifiers BT3 and BT4, and so on. This scheme may also be used to facilitate installation. Sensor devices, such as occupancy sensors or daylighting sensors, are similarly self-identified. Plug load devices are also similarly self-identified. Such a configuration is cumbersome in prior art systems that require careful wiring installation, mapping and commissioning with advanced commissioning tools.

Once load and device identification is complete, the master Controller broadcasts a message 44 to the network that all devices should perform their specific automatic or self-configuring (self-commissioning) algorithm such as algorithm 45 in controller device 40. Each device is programmed using an algorithm in the controller device that designates or binds load control devices to loads in a way that covers most load control scenarios while maintaining adherence to energy-saving building code requirements. Switches with multiple buttons will bind their individual buttons to loads such that the first button is bound to the first load, the second button is bound to the second load, and so on. If there are more buttons than loads, the remaining buttons remain unbound and indicate this status when pushed. For example, a bound button may turn on its LED indicator when its load is activated by a button press whereas an unbound button may simply flash its LED indicator a few times when pressed. If there are more loads than buttons, the last remaining button is bound to the remaining loads. For example, if there are 2 buttons and 5 loads, then button 1 controls load 1, button 2 controls loads 2 through 5. This technique ensures that every load is bound, or configured to a switch on a load control device. In simple installations where the number of buttons equals the number of loads, binding is done on power-up and the installer need not perform any other tasks. This is especially true if the installer is trained to pay attention to the MAC address hierarchy when connecting controller devices to their corresponding loads. Controller devices with more than one load may have their internal load hierarchy for the controller printed on them for easy reference during this process. For example, controllers with two relay outputs may have the relays labeled A and B so the installer will know that relay A will be assigned the lowest load number for that controller. In addition, testing of the installation is easy since the installer will know exactly how the system will perform on power-up. Thus, the installer does not need to spend extra time commissioning or binding switches and loads with a commissioning tool therefore, the cost and schedule of an installation arc both improved.

An occupancy sensor such as sensor 46 may be treated like a one-button switch wherein it is assigned to all controller loads during initial self-configuration. This helps meet energy saving standards once self-configuration is completed, but without the need to perform complex manual configuration to meet those same standards. In addition, the occupancy sensor may be automatically configured for energy saving modes of operation, for example, the sensors may be automatically configured to manual on/automatic off operation for only the highest numbered load and automatic on/off for the remaining loads (automatic refers to the sensor controlling the state of the load directly). Daylighting sensors such as sensor 47 may be similarly self-configured, but some manual configuration is anticipated since mapping of particular lighting loads and daylighting sensors to the proximity of windows, skylights, or work spaces may not have been done. Also, in the preferred embodiment, plug loads are mapped only to occupancy sensors and not to switches during self-configuration since most installations prefer that sensors control plug loads; some manual configuration is also anticipated since the layout of cubicles and other workspaces may be not known at the time of installation.

The electrical load control system such as system 30 automatically self-configures to a basic state of operation that may be suitable for many installations and that meet minimum requirements for energy savings. The automatic configuration may be selected to automatically establishes system operation consistent with energy code requirements such as California Title 24 and ASHRAE 2010. Examples:

A 2-load on/off Room Controller and a 2-button wall switch—each button is bound to one load each for manual on/manual off operation.

A 2-load on/off Room Controller, a 2-button wall switch, and an occupancy sensor—each button is bound to one load each for manual on/off, the sensor controls the first load as automatic on/off (overrides the switch to turn load off automatically) and manual on (via the switch)/automatic off for the second load.

A 2-load on/off room controller and an occupancy sensor—each load is controlled by the sensor as automatic on/off.

A 2-load on/off room controller, a 3-button switch, an occupancy sensor, and a plug load controller—the first two buttons are bound one each to the two loads, the third button is un bound, the first load is controlled by the occupancy sensor for automatic on/off (sensor overrides the switch for automatic off) and the second load is controlled by the sensor for manual on/automatic off, the plug load is automatically controlled only by the occupancy sensor for automatic on/off.

Priority Array State Machine
 The priority array state machine is the algorithm that determines the state of an electrical load and the algorithm is driven by control signals which are called events. Events feeding the state machine arrive via the low voltage communication network or bus. The device originating the event is irrelevant to the state machine processing, however, system level events like Shed and Schedule can also originate in the low voltage communication network.
 Each controller includes a priority array state machine for every load it controls. A suitable priority array state machine may have a binary output or it may have multiple levels to accommodate dimming loads or other similar device demands. Some events may be internally generated by the state machine. Different types of events have different priorities, the active event with the highest priority is determines action taken by the controller.

Automatic Commissioning
 Most energy-efficient scenario
 Sensor only: Auto-ON
 Sensor and Switch: Manual-ON/Auto-ON, 2-relay RC:
 Relay 1: Auto-ON
 Relay 2: Manual-ON
 Controller devices arbitrate to decide Master
 Device 10 and MAC address
 Highest becomes master controller device
 Master controller device in charge of load enumeration Low Voltage Power and Communication Network Characteristics
 Provides default behavior upon initial installation of devices in the network
 On Power Up the controller devices arbitrate to decide who becomes the Master controller device
 Master controller device is in charge of:
 Enumerating the Loads (assigning individual IDs).
 Commission Load Switches
 Commission Scene Switches
 Commission Sensors Master Arbitration and Load Enumeration
 Each controller device has a Device Type ID and a MAC address
 An RC-101 and an RC-102 do not have the same Device Type ID
 Higher Device Type ID has precedence
 Within the same Device Type 10, higher MAC address has precedence
 The controller device with highest Device Type ID/MAC address will become the master controller device.
 Precedence level is maintained for Load Enumeration, thus the assignment of Load IDs is predictable (next slide has the details)
 If automatic initial commissioning has not been locked out then it will happen every time the system powers up.
 Manual restart of automatic initial commissioning will be needed in special circumstances.
 If when adding a new RCI it gets powered up BEFORE plugging the RJ45 jack
 When adding an controller device that had been previously commissioned in another network.

Switch and Load Binding
 It is always predictable, you will know which Push Button in the Switch will control which Load or set of loads at the time they are been wired
 Each switch binds its buttons to the Loads in the space so that no Load is left unbound (you can control all loads in the space from every switch)
 Two easy to remember rules are followed by each Switch:
 1. If number of buttons>number of loads then Each button is bound to each load in sequence, the extra buttons will control nothing and will blink 3 times at a ½ hz Hz rate
 2. If number-of-buttons<=number-of-loads then Buttons get assigned to individual loads, the last button on every switch controls all remaining loads
 For example, In a room with 5 loads, an 5 W-102 switch and an 5 W-103 switch
 Button 1 of 5 W-102 will control load 1
 Button 2 of 5 W-102 will control loads 2, 3, 4 and 5
 Button 1 of 5 W-103 will control load 1
 Button 2 of 5 W-103 will control load 2
 Button 3 of 5 W-103 will control loads 3, 4 and 5
 It is expected that most rooms will have switches with the same number of buttons as loads are to be installed, PnG is all these rooms will ever need.

Selective Commissioning
 Config button and LED to enter/exit
 Press & hold config button for 2 sec on any device
 Config LED of ALL devices blink
 1st load turns on, all other loads are off
 Assigned button LED lights. Pressing the button will deselect
 Selecting/Unselecting loads with sensors is done via up/down buttons
 Press ANY config button, system goes to next load
 Press & hold ANY config button for 2 sec will exit PnL
 Press & hold ANY config button for 10 sec will clear ALL devices and restart PnG Power failure Memory
 Provides customized behavior without the need of a commissioning tool
 Master RC arbitration and Load enumeration from PnG remain valid
 PnL allows:
 Custom binding between Switches and Loads Area separation based on Dcc Sensor coverage (not required by Marketing)
Scene assignments
Room Modules configuration
Selective Commissioning Sequence of Operation
Config Button and Config LED
Every IRB device has a Config button and LED that allows the IRB network to enter into PnL mode
Pressing the config button for two seconds gets the device into local Config mode (we are not in PnL mode yet). Local Config mode is dependant on the device
Pressing the Config button again for two extra seconds will cause the IRB to get into PnL mode (if it has not been locked out)
PnL mode
PnL is controlled by the Master controller device upon entering PnL all devices will flash their Config LED and the Master RC will shut down all loads except the 1st one (only one Load is active during PnL)
While the load is active switches that have button(s) bound to such load will turn ON the respective LED(s)
The user can then create of destroy bindings by pressing the push buttons only those with the LED turned ON will be bound to the active load. Other devices (Room Modules, Occ Sensors, etc) behave differently during PnL
Pressing the Config button briefly (anywhere) will instruct the Master RC to go to the next load in the sequence.
Pressing the Config button (anywhere) for two seconds will instruct the Master RC to exit selective commissioning
Low Voltage Power and Communication Network Characteristics:
Free Topology up to 1000 feet of wire
Communications and Power are delivered using CATS cable (RJ45 connectivity at every device)
Up to 48 devices can be connected for communication
Power provided by the controller devices
Additive power (if code allows)
Power Supply(ies) limit the number of devices that can be connected.
protocol:
Supports up to 64 loads (not the same as CONTROLLER DEVICEs) in the room
Collision avoidance and collision detection implemented
Load and Scene control support PnG and PnL capable
Unicast} Multicast and Broadcast addressing types available
Network Load and Scene Control
Load Control
Switch buttons can be explicitly bound to control individual loads or a group of them.
There can be as many different groups as there are buttons in the low voltage power and communication network
Switch buttons know which loads are part of their group, thus they can track them down to display the status of the group
Scene Control
IRB networks can be logically separated in up to 4 areas, normally Dcc Sensor
coverage will determine such areas
Each Load in the IRB can belong to only one area
Each area has 16 scenes associated with them, 8 are free for the user to configure, the rest are reserved by the IRB protocol (Dcc Sensors, Daylight Controllers and System Level events)
Scene control devices (Scene Switch, Dcc Sensor, Daylight Control, etc) do not necessarily need to know which loads respond to the Scene Commands
Unique identifier in each device allows multiples of the same device type to coordinate the numbering of each input or output on each device, referred to enumeration within the context of establishing an ordered list, a master-slave(s) relationship, or a priority level. It is preferred that the highest number establish the first in the list, the master, or the first priority.

Secondary unique identifier scheme is used amongst device families, e.g., a 2-load room controller identifier would be selected from a group with a higher sequence of numbers than a 1-load room controller identifier, thereby ensuring the a 2-load room controller will always have a higher numbered identifier than a 1-load room controller, e.g., to guarantee that a 2-load room controller will always be a master to a 1-load room controller in an installation using one of each type of room controller.

On initial application of power to the system, each device broadcasts its identifier to establish enumeration with devices of the same type or family using an arbitration process. The result is that each device on the low voltage power and communication network 14 establishes a unique identifier for each of its inputs and outputs, thereby establishing an ordered list of inputs and an ordered list of outputs for the low voltage power and communication network 14 as a whole. It is preferred that the enumeration process be disabled once the system has been manually commissioned so that, in the event of power loss, the system does not attempt to re-enumerate and erase bindings set by the manual commissioning process.

The electrical load control system automatically establishes system operation consistent with energy code requirements such as California Title 24 and ASHRAE 2010. Examples:

A 2-load on/off Room Controller and a 2-button wall switch—each button is bound to one load each for manual on/manual off operation.

A 2-load on/off Room Controller, a 2-button wall switch, and an occupancy sensor—each button is bound to one load each for manual on/off, the sensor controls the first load as automatic on/off (overrides the switch to turn load off automatically) and manual on (via the switch)/automatic off for the second load.

A 2-load on/off room controller and an occupancy sensor—each load is controlled by the sensor as automatic on/off.

A 2-load on/off room controller, a 3-button switch, an occupancy sensor, and a plug load controller—the first two buttons are bound one each to the two loads, the third button is un bound, the first load is controlled by the occupancy sensor for automatic on/off (sensor overrides the switch for automatic off) and the second load is controlled by the sensor for manual on/automatic off, the plug load is automatically controlled only by the occupancy sensor for automatic on/off.

6. Plug 'n Go automatically binds loads to switches and adjusts for an unequal number of loads versus switches. Examples:

a. A 3-load on/off room controller and a 1-button wall switch—all loads are bound to the 1-button.

b. A 3-load room controller and a 2-button wall switch—the first load is bound to the first button, the remaining loads are bound to the second button.

c. A 3-load room controller and a 3-button wall switch—each load is bound to just one button, first-to-first, second-to-second and third-to-third.

d. A 3-load room controller and a 4-button wall switch—the first three loads are bound to the first three buttons as described above, the fourth button is unbound and blinks its LED when pressed to indicate its unbound status.

Figure 2:
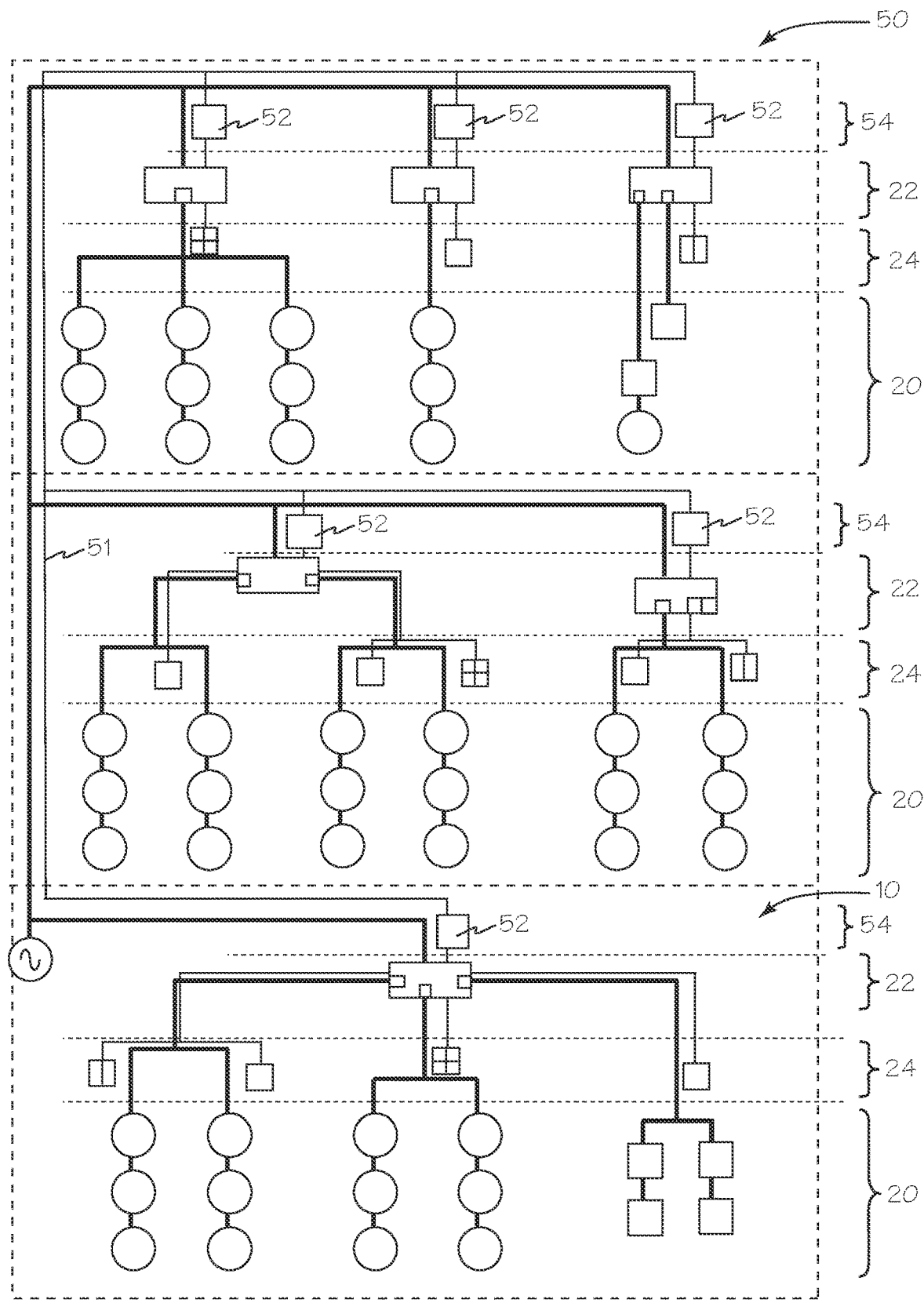
FIG. 2 is a block diagram of an alternate electrical load control system.

Referring now to FIG. 2, electrical load control system networks such as systems 10 and 50 may be connected to one another through a standard backbone such as BACNet (Building Automation and Control Network 51. In this case, low voltage power and communication network 14 must have special capability to interface to such a backbone. A separate interface module such as building network modules 52 in layer 54 is attachable to controller devices to establish the link between the low voltage power and communication network 14 and the backbone 51. The unique feature of this interface is that it makes this interface transparent to either side of it. The backbone appears to be just another Room Device or Room Controller to the Room Network, and the Low voltage power and communication network 14 components appear to be standard components of the chosen backbone system. This unique feature allows easy connection to the chosen backbone system and easy control the Low voltage power and communication network 14 components by the master controller in the backbone system. This setup now allows Room Devices 10 control loads outside of the Room Network. Indeed, this is a good example of a situation wherein it is advantageous to allow the number of logical loads in the Low voltage power and communication network 14 to be greater than the number of physical loads on the Room Network.

The discussion above uses line power to designate electrical power delivered to loads to perform work. In the United States line power is 60 cycle, 110 volt AC power. Any other suitable power source may be used as line power with appropriate component configuration for higher power demands.

While the preferred embodiments of the devices and methods have been described in reference to the environment in which they were developed, they are merely illustrative of the principles of the inventions. Other embodiments and configurations may be devised without departing from the spirit of the inventions and the scope of the appended claims.

We claim:

1. A system for controlling the application of electrical power to electrical loads comprising:
    a power network interconnecting the electrical loads to line power;
    a low voltage communication network interconnecting at least one controller device and one or more load control devices wherein each controller device provides electrical power to the low voltage communication network and each load control device receives electrical power from the low voltage communication network and transmits one or more identification signals and one or more control signals through the low voltage communication network; and
    a processing means inside each controller device for receiving and processing the identification signals from each of the load control devices, the other controller devices and the loads and a configuration means wherein the processing means uses the configuration means to generate and transmit configuration signals to the load control devices and the other controller devices and wherein the processing means further receives and processes control signals from the power control elements and controls the application of electrical power to electrical loads according to the control signals and the configuration signals and wherein the master controller includes a processing means for controlling the application of electrical power to the one or more of the plurality of electric loads.

2. The system of claim 1 wherein each of the load control devices includes a visual indicator for indicating the power status of the one or more loads of the plurality of electrical loads to which the load control device is bound.

3. The system of claim 1 wherein each of the load control devices includes two or more load control assemblies.

4. The system of claim 2 wherein each of the load control devices must receive a confirmation signal from a controller device that a load is on before the bound load control device can display an on status.

* * * * *